June 4, 1968  H. E. LONES  3,386,846
ACTIVATABLE ADHESIVE SHEETS WITH PEAKED AREAS
OF LESSER POTENTIAL ADHESIVE TENACITY
Filed June 19, 1963

INVENTOR
HARRY E. LONES
BY
Lionel H. White
AGENT

United States Patent Office 3,386,846
Patented June 4, 1968

3,386,846
ACTIVATABLE ADHESIVE SHEETS WITH PEAKED AREAS OF LESSER POTENTIAL ADHESIVE TENACITY
Harry E. Lones, Hudson, N.H., assignor to Nashua Corporation, Nashua, N.H., a corporation of Delaware
Filed June 19, 1963, Ser. No. 288,964
5 Claims. (Cl. 117—11)

The present invention relates to packaging and package sealing, and particularly relates to activatable adhesive sheets useful in forming seals and labels in the packaging of articles of food such as bread, cakes, rolls and the like.

As a means of retaining freshness and quality in food articles, such as bread loaves and other bakery goods, producers of such goods employ, to a near universal extent, the moisture-proof and vapor-retentive qualities of packages comprising a wide variety of packaging sheet materials. Of outstanding significance in such packaging are wax coated papers, regenerated cellulose films, and transparent plastic films such as the polyolefins, notably polyethylene and polypropylene. These packaging materials are employed, for the most part, in the formation of relatively close-fitting wrappers for the food article and are generally constructed by wrapping about the article a sheet of the packaging material of such dimensions as to ensure that the sheet overlie all the outermost surfaces of the article with sufficient excess sheet material to allow overlapping of the edges of the sheet, one upon another, to form packaging-sealing seams. The wrapping sheet is usually comprised of, or coated with, materials activatable to adhesiveness by heat or other activating means, and by applying such means to the overlapping seam areas of the package wrapper there are formed relatively air-tight closures to protect the food article from undesirable odors, loss of moisture, or the like.

A widely used food package of the type described is that represented by the bread loaf wrapper having a sealed seam along the bottom side of the loaf and having overlapping folds sealed at the ends of the loaf. In this type package it is often desirable to supplement the adhesive seals of the bulkier overlapped fold seams at the loaf ends to preserve the protection originally afforded by the packages and, normally, adhesive coated paper labels are applied over the end fold seals to strengthen the package in these areas. Numerous adhesive compositions are available for use on paper labels of this type and extensive use is made of the normally non-tacky coating which is heat activatable to adhesiveness, since labels bearing such coatings may be practically applied in a single step concurrently with the heated sealing operation common to most packaging processes.

It may be noted that food articles of the type mentioned, that is bakery products such as bread, cakes, and the like, have a definite and relatively low rate of consumption. A particular packaged item of this type may have an active consumption period extending over a number of days. Because of this it has been recognized that the freshness and palatability of these food articles may be greatly enhanced during the consumption period if the wrapper sheet material can be retained physically intact upon initial opening of the package in order that the wrapper may be tightly closed about the article after withdrawal of a portion of the contents of the original package. To this end it has been found desirable to employ end seal labels which bear a non-permanent adhesive, that is, an adhesive which will not form a paper-tearing bond with the wrapper sheet at the overlapped end fold areas and which will allow ready removal of the label from the wrapper. It has further been found highly desirable to provide the consumer with a means by which the initial adhesiveness of the end label may be overcome and removal of the label may be facilitated, such as by means of a non-adherent tab-like portion of the label.

It is an object of the present invention to provide an adhesive label with means for ready removal. A further object of the invention is to provide a normally removable adhesive label with means for initiating such removal. Yet another object of the invention is to provide a means for effectively varying the degree of potential activated adherence of selected areas of normally non-tacky, adhesively activatable label coatings. Still another object of the invention is to provide a bread loaf package with an adherent end seal label presenting a non-adherent edge readily available to be grasped for removal of the label and opening of the package. Other objects of the present invention will become apparent in the following description.

The ready removal of a label from sealing engagement with a package closure seam is greatly facilitated if a portion of the label at its edge is not adhered or is only slightly adhered to the package or wrapper surface. Under such circumstances the label may be grasped at the non-adherent area with little trouble or delay and the label may be readily peeled or otherwise pulled away from the wrapper in order that the package might be opened by way of the overlapped end folds.

Methods of providing a "dead edge," that is, an edge area of a label having substantially no adherent qualities with respect to the surface to which the label is applied, include (1) omitting aadesive or potentially adhesive coating from the area, (2) rendering an adhesive or potentially adhesive coating inactive by masking or covering such coating with a non-adhesive material in the desired areas, or (3) otherwise rendering the desired areas of the label adhesive ineffective for the purpose of binding the label to the package surface.

The present invention employs the latter of the abovementioned general methods and specifically comprises a method whereby the coated surface of a potentially adherent label is formed, in the area of the desired dead edge, into a multitude of raised areas so that at the plane of contact between the label and the adherend surface only a minor percentage of the adhesive coating in the dead edge area will be allowed to contact the adherend surface. In this manner the effective adherence of the dead edge area of a label may be reduced even to the extent that that area of the label will be unable to withstand the slightest handling of the package and will, for all practical purposes, be unattached from the surface of the package, thereby presenting a grasping tab for removal of the label.

According to a preferred embodiment of the present invention desired areas of adhesive coated sheets are rendered of low adhering capacity by embossing the coated sheet with a regular pyramidal or wedge-shaped knurl so a minor portion of the coated side of the sheet is effectively raised to form contact points of the base sheet surface which lie in a plane disposed above the surface of a portion of adhesive coating. As a result that portion of the adhesive surface is held out of contact with the adherend surface over the desired "dead edge" area and the adhesive tenacity of that area is reduced in proportion to the resulting loss of contact surface.

The invention may be more clearly understood upon reference to the accompanying drawings wherein.

Figure 1:
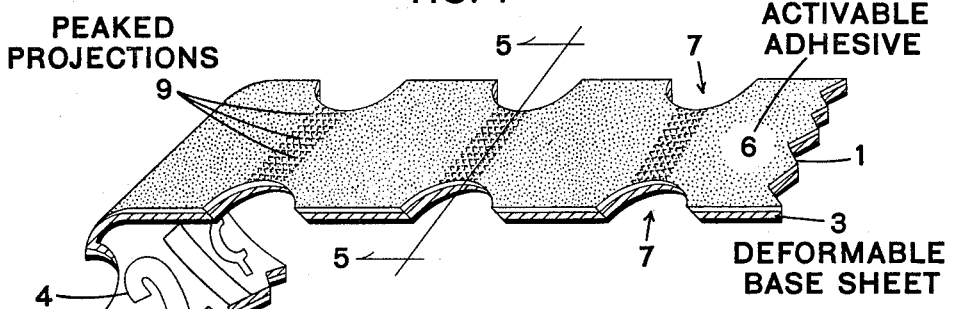
FIG. 1 represents a segment of a strip of bread package end labels with the "dead edge" area located at the line of division between labels.

It is common practice in the coatings industry to apply adhesive coatings and the like to continuous strips of paper or other sheet material in the form of a layer which will completely cover the whole of one side of such sheet material. In the interest of economy it is also a normal procedure to coat as wide a sheet as can be practically handled on available equipment. As a result of these practices any number of variations in sizes of sheets, tapes, or strips may be obtained by simply cutting or slitting the original coated sheet to desired dimensions. It will be noted that as a further result of such operations the entire surface area of the coated side of finished material will bear coating composition. In the event that such a composition is an adhesive the whole of the coated surface of any strip, tape, label, or sheet will adhere to an adherend surface to which it might be applied and for which it has adhesive affinity.

In the event that it becomes desirable that only a portion of an adhesive coated surface exhibit effective adhesive affinity, as in the case of the previously mentioned adhesive labels having "dead edge" non-adhesive areas, the coating compositions may be "located." That is, coating may be applied to preselected portions of the original base sheet stock relative to the desired location of coating on the finished product. Such "located" coating is very similar to printing and requires the same quality of equipment, register control and the like, with the consequent expense, as does printing.

The problems of located coating may be to some extent avoided by combining the operation of overall coating of sheets with subsequent printing of "abhesives," that is adhesive preventative materials such as non-adhesive inks, varnishes, or the like, onto portions of the coating surface which are to become non-adhering in the final product. While such applications of abhesive varnishes and the like might be economically accomplished during normal printing operations, the non-adhesive side of labels as a rule being printed with producer's advertising, pricing or the like, suitable abhesive materials are not readily available, particularly where adhesive composition coatings of the heat-activated type described by Perry, U.S. Patent 2,462,029, are employed. The use of such adhesive compositions on bread package end labels and on other label papers is particularly common and there is a strong tendency for the plasticizers and tackifiers comprising such compositions to likewise effect the resin or varnish abhesive compositions. In addition, the application of abhesive materials will normally require further operations such as drying with the added expenses resulting therefrom.

The practice of the present invention eliminates any additional overprinting and drying operations since the embossing operation is exclusively dry and mechanical, and is normally accomplished as a final step in the label-making process such as at the slitting or register index punching operations. In either case the embossed area may be readily located with respect to the registered label cut-off normal in most bread loaf packing machines which are adapted to apply end labels to the package.

FIG. 1 of the drawings shows a section of a strip 1 of end labels prepared according to the present invention and which comprises a base sheet 3 of paper bearing a coating 6 of a composition normally non-tacky and activatable by heating to adhesive tackiness. The opposite side of the label sheet normally carries printed indicia 4 and in order to retain the integrity of such printing in an applied label the location of the line of severance of a label from the strip is controlled by slots or notches 7 which engage strip feeding cogs on the labeling machine.

Figure 2:
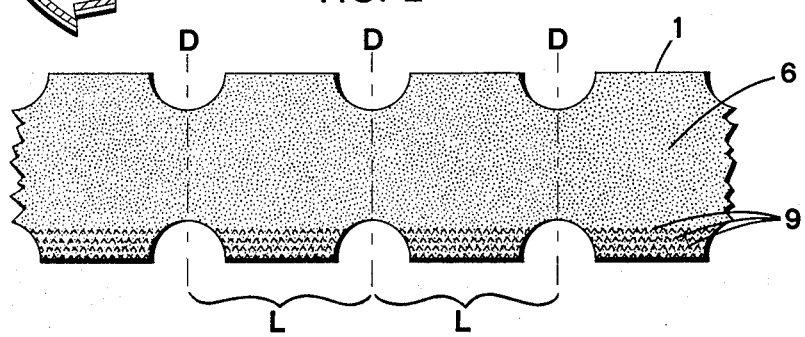
FIG. 2 shows a top plan view of a similar strip of labels varying in the location of the "dead edge" area.
Figure 3:
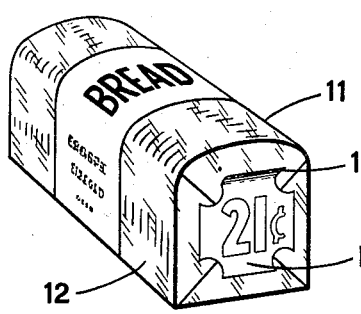
FIGS. 3–4 show bread loaf packages bearing end labels embodying the variations shown in the above figures.
Figure 4:
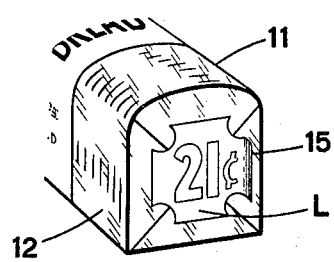

The essence of the instant invention lies in the formation by embossing or the like, of numerous peaks or raised projections 9 at the coated face of the label in such areas relative to the predetermined line of severance of the label that a substantial area of such coated face adjacent an edge of the label, as it is applied to a package surface, bears such peaks. The peaks 9, as previously mentioned and as will be later more fully described, render the coated area in which they are located only slightly effective as an adhesive bonding surface with the result that such an area will become disengaged from the surface to which the label is applied and will form a tab by which the label may be grasped for package opening. Location of the peaked area adjacent the predetermined transverse division line along which sectional view 5—5 is taken in FIG. 1 will result in a package 11, as shown in FIG. 3, having the label L detached from the adherend wrapping sheet 12 along its upper edge to form the free tab 13. Variations in the location of the peaks 9 are acceptable to meet individual preferences and such a variation lies in locating the peaked area adjacent a longitudinal edge of the strip 1, as in FIG. 2, so that each label L, determined by the registered division or severance lines D, will bear a low adherence peaked area at a vertical edge to form a free tab 15 at the side of the label as in FIG. 4.

Figure 5:
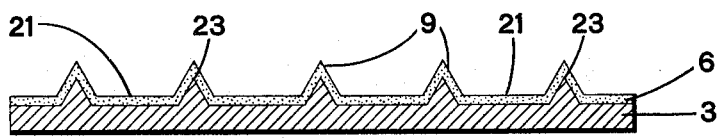
FIG. 5 represents the sectional view 5—5 of a label shown in FIG. 1.

One embodiment of the present invention may be seen in the sectional view of FIG. 5 taken along the label division line 5—5 of FIG. 1. The peaks 9 are formed at the coated surface of the label strip base sheet by compressing the coated sheet by means of an embossing roll or the like in areas 21 so that portions or peaks 23 of the base paper sheet 3 lie in a plane disposed above the surface of the activatable adhesive coating 6 at the embossed areas 21.

Figure 6:
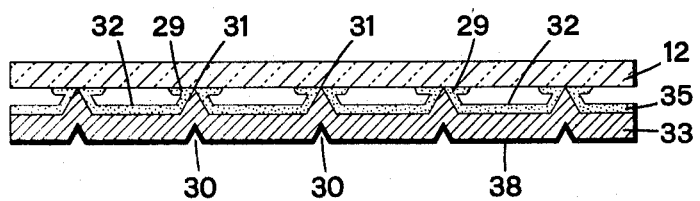
FIG. 6 shows a similar section of a label after activation and application to an adherend surface.

A preferred method of forming the low adherence peaked areas of the instant invention will be evident from the sectional view of a label in FIG. 6. A plane or cylindrical knurled surface (not shown) is used to indent the non-coated surface 38 of the label strip at points 30 with a resulting matching formation of peaks 31 in the base paper 33, such peaks lying in a plane disposed above the normal surface plane of the activatable adhesive coating 35.

The effect of the peaks in the low adherence areas of the present invention may be readily observed in the sectional view of FIG. 6. Subsequent to the activation to adhesiveness of the label coating and application of the label to an adherend surface 12 only those portions 29 of the adhesive coating 35 immediately adjacent the tips of the peaks 31 are able to contact the adherend surface 12. The remaining portion of the adhesive surface 32 is held out of contact with the adherend surface 12 by reason of the fact that the surface 32 lies below the plane of the contacting points 31 of the base paper sheet 33 and as a result the sheet or label is deprived of the adhesiveness which would otherwise be contributed by the adhesive composition at the surface 32.

The number and spacing of peaks necessary to provide a label "dead area" of sufficiently low effective adhesiveness to allow that area to become detached from the adherend depends on the weight and stiffness of the paper base sheet and the adherent tenacity of the activated adhesive composition employed. In view of the fact that normal variations in these properties will result in innumerable combinations, the extent and pattern of peaks is expected to be most practically determined by routine experimentation well within the abilities of the normal skilled technician and not beyond the scope of the present invention. It has been found that in a particular instance a preferred label with good tab-forming properties may be prepared from stock comprising a base sheet of a 39 lb. per ream (25 x 38—500) two side finished sulfite paper with a coating of about 8 lb. per ream (24 x 36—500) of a normally non-tacky heat activated adhesive composition exhibiting a resistance of about 200 grams per inch width when peeled at 12 inches per minute in a direction normal to the adherend surface by impressing the uncoated side of the sheet with a plane surface knurl of 0.045 inch pitch, 90° pyramidal form teeth to form peaks at the coated side according to the present invention in quincuncial formation in a density of about 70 peaks per sq. cm. The peel resistance of the "dead area" so formed is reduced, in a typical example, to about 15% and 5% of that exhibited by the original non-embossed sample when applied to adherend surfaces of regenerated cellulose and polyethylene, respectively.

Pyramidal form knurls varying from 90°, that is 60°/30° or the like, are similarly effective; however, it is preferred that when such knurls are used to emboss peaked areas located adjacent the transverse division line, as in FIG. 1, the longer diagonal of the pyramid base be so oriented as to lie perpendicular to the division line. In this manner it is ensured that a greater percentage of effective peaks will lie along the divisional line of severance, hence will lie at the very edge of the label when it is severed from the strip. In order to further ensure edge location of peaks it is preferred to locate the embossed area, to some extent, on both sides of the divisional line of severance.

The matrix against which the embossing is accomplished will, of course, be selected according to personal preference and the depth of penetration of emboss desired. It is particularly interesting to note that the stress imported to the base sheet during the embossing step is retained by the sheet and, after adherence of a label to a surface, will cause a curl of the then "dead area" tab which, in some events, depending on the particular adhesive formulation used, is sufficiently great to overcome the limited adhesive tenacity in that area and cause the tab to part from the adherend surface independently of other externally applied stresses.

While the greater portion of the foregoing description has been presented with reference to heat-activated adhesives and bread package end labels it will be understood that the instant invention may be applied in uses of any solvent- or water-activatable adhesive coatings where it is desired to reduce the effective adherence of such coated sheets. Pregummed labels may be made selectively adhesive in the described manner. It is further recognized that the principles of the invention may be applied to other fields than flexible packaging of food and will be useful in most areas of temporary labeling and package closure.

What is claimed as the present invention is:

1. A potentially adhesive label comprising a paper base sheet bearing on the whole of a surface thereof a substantially continuous coating of a normally non-tacky composition activatable to adhesive tackiness, the coated face of said label comprising definite areas of greater and lesser potential adhesive tenacity, said coated surface of said base sheet being deformed in said area of lesser potential adhesive tenacity to present a plurality of peak-like projections extending beyond the level of a portion of the surface of said coating disposed within said area of lesser potential adhesive tenacity whereby contact of said projections with an adherend surface will prevent contact of said portion of coating surface with said adherend surface when said composition is in the activated tacky state.

2. A potentially adhesive label according to claim 1 wherein said area of lesser potential adhesive tenacity lies adjacent an edge of said label.

3. An article of manufacture comprising a strip of potentially adhesive labels joined one to another in longitudinal array at transverse lines of division, said strip comprising a paper base sheet bearing on the whole of a surface thereof a substantially continuous coating of a normally non-tacky composition activatable to adhesiveness by the application of heat, a section of said coated surface of said base sheet being deformed to present a plurality of peak-like projections extending beyond the level of a portion of the surface of said coating disposed in the area between the tips of said projections whereby contact of said projection tips with an adherend surface will prevent contact of said portion of coating surface with said adherend surface thereby reducing the available adhesive contact area of said coating when said composition is in the activated tacky state.

4. An article of manufacture according to claim 3 wherein said deformed section of said base sheet surface is located immediately adjacent a said transverse line of division.

5. An article of manufacture according to claim 3 wherein said deformed section of said base sheet surface is located immediately adjacent an edge of said strip.

References Cited

UNITED STATES PATENTS

| | | | |
|---|---|---|---|
| 770,293 | 9/1904 | Kendrick | 161—131 |
| 1,027,547 | 5/1912 | Kaber | 117—122 X |
| 2,015,268 | 9/1935 | Hammond | 117—122 X |
| 2,667,436 | 1/1954 | Goepfert et al. | 117—68 X |
| 2,861,006 | 11/1958 | Salditt | 117—11 X |
| 2,984,573 | 5/1961 | Smith | 99—172 |
| 3,025,167 | 3/1962 | Butler | 99—171 |
| 3,030,231 | 4/1962 | Bar | 117—8 |
| 3,073,303 | 1/1963 | Schaar | 117—122 X |

WILLIAM D. MARTIN, *Primary Examiner.*

MURRAY KATZ, *Examiner.*

W. D. HERRICK, *Assistant Examiner.*